United States Patent
Peirson et al.

(10) Patent No.: US 7,434,072 B2
(45) Date of Patent: Oct. 7, 2008

(54) INTEGRATED CIRCUIT POWER MANAGEMENT CONTROL

(75) Inventors: Adrian Mark Peirson, Cambridge (GB); Catalin Theodor Marinas, Cambridge (GB); James Ian McNiven, Ely (GB); Krisztian Flautner, Cambridge (GB)

(73) Assignee: ARM Limited, Cambridge (GB)

( * ) Notice: Subject to any disclaimer, the term of this patent is extended or adjusted under 35 U.S.C. 154(b) by 291 days.

(21) Appl. No.: 11/113,310

(22) Filed: Apr. 25, 2005

(65) Prior Publication Data

US 2006/0242436 A1    Oct. 26, 2006

(51) Int. Cl.
G06F 1/00 (2006.01)
G06F 1/32 (2006.01)
(52) U.S. Cl. .................. 713/300; 713/320; 713/322
(58) Field of Classification Search ........... 713/300, 713/320, 322
See application file for complete search history.

(56) References Cited

U.S. PATENT DOCUMENTS

| | | | | |
|---|---|---|---|---|
| 5,560,022 A | * | 9/1996 | Dunstan et al. | 713/300 |
| 6,845,456 B1 | * | 1/2005 | Menezes et al. | 713/320 |
| 7,080,267 B2 | * | 7/2006 | Gary et al. | 713/300 |
| 7,131,015 B2 | * | 10/2006 | Flautner et al. | 713/320 |
| 7,206,951 B2 | * | 4/2007 | Ishibashi et al. | 713/323 |
| 2004/0039954 A1 | * | 2/2004 | White et al. | 713/322 |

* cited by examiner

*Primary Examiner*—Suresh K Suryawanshi
(74) *Attorney, Agent, or Firm*—Nixon & Vanderhye P.C.

(57) ABSTRACT

Power management control software including power management policies is provided with those policies divided into observation code 18, 20, 22 and response code 26, 28, 30. When predetermined execution points 10, 12 within the operating system 2 are reached registered observation code 18, 20 for those execution points 10, 12 is triggered to be executed and serves to store event data within an event data store 24. At another time independent of the execution points 10, 12, the response code 26, 28, 30 is executed to read the event data from the event data store 24 and generate power control predictions and control signals therefrom.

9 Claims, 4 Drawing Sheets

INTEGRATED CIRCUIT POWER MANAGEMENT CONTROL

BACKGROUND OF THE INVENTION

1. Field of the Invention

This invention relates to the field of integrated circuits. More particularly, this invention relates to power management control within integrated circuits.

2. Description of the Prior Art

It is known to provide integrated circuits with power management control mechanisms, such as the Intelligent Energy Manager mechanisms designed by ARM Limited of Cambridge, England. These mechanisms use a combination of hardware and software to control the supply voltage and clock frequency of an integrated circuit such that the performance delivered by that integrated circuit matches the performance requirements of the applications and processes being executed thereby reducing the energy consumed. In particular, this technology reduces the operating voltage and clock frequency so as to just exceed the required performance which has been determined without providing an excess of performance which would needlessly waste energy.

Whilst such techniques and technology are useful, a problem that arises is that the control software which determines required performance and monitors the system should not in itself degrade the system performance by, for example, increasing the latency associated with certain normal operational tasks, such as task switching. It is desirable to be able to provide power management and control mechanisms which intrude little upon the normal operation as perceived by a user.

SUMMARY OF THE INVENTION

Viewed from one aspect the present invention provides a method of controlling power consumption of an integrated circuit, said method comprising the steps of:

executing an operating system computer program including at least one execution point corresponding to an execution event to be logged;

upon execution of said at least one execution point, triggering execution of observation code operable to store in an event data store event data characterizing one or more parameters associated with said execution event;

independently of execution of said at least one execution point, triggering execution of response code operable to read said event data from said event data store and in dependence upon said event data to generate one or more power control commands; and in response to said one or more power control commands, controlling power consumption of said integrated circuit.

The present technique recognises that the power management control software can be divide into different portions, namely an observation portion and a response portion. The observation portion captures data characterizing certain observed events occurring within the system. These events are part of the normal operation of the system and accordingly their observation and recording should be quick and non-intrusive. The other portion of the power management control software deals with the response to the observed and stored event data. This response can execute one or more algorithms to analyse the captured event data and generate predictions for required performance which may be used to control the integrated circuit. The observation task by being separated out can be stripped down to be quick, simple and bounded such that it does not intrude to a significant degree upon the normal operation of the system. The response activities are generally more complex and can be unbounded in extent. However, the response can be separately triggered at an appropriate time such that it will not have an undue effect upon the perceived performance or the latency of the system. The present technique, divides out the observation and event data storage as triggered by certain execution points being reached from the response activity which is triggered independently of those the execution points being reached.

Whilst it will be appreciated that the response activity could be triggered in a variety of different ways, a preferred technique is to use a timer monitored by the operating system computer program. Such timing mechanisms are typically already provided within operating systems and may be conveniently employed to schedule response activity upon a regular basis without being unduly intrusive.

Whilst the event data recorded can vary, preferred examples of event data include a timestamp, a task identifier of a currently executing task, a currently set performance level of the integrated circuit, an identifier of an execution event corresponding to the event data recorded and/or an indication of whether the currently executing task is the idle task. It will be appreciated that further data may also be recorded as desired by a particular observation mechanism.

The power consumption of the integrated circuit can be controlled and adjusted in various ways, such as by selectively shutting down certain power domains or blocks. Preferred embodiments of the invention utilise dynamic control of operating voltage and clock speed to control power consumption in a manner determined by the response mechanisms.

The performance control may work in a variety of different ways, but in preferred embodiments the operating system computer program is operable to schedule execution of one or more application computer programs and the power consumption is controlled to give a substantially minimum level of processing performance required to meet processing requirements of the one or more currently executing application programs.

In some embodiments, a power management kernel serves to respond to the execution point being reached and then to determine which of a plurality of instances of observation code are associated with that execution point and in turn trigger execution of those instances of observation code which are associated with the execution point. Thus, different power management policies with associated observation requirements and response requirements (algorithms) can be provided as desired and the power management kernel used to link execution points within the operating system to those policies as desired.

Each instance of observation code may have an associated instance of response code and all instances of the response code are triggered to execute from the same stimulus. Thus, all the responses can be determined irrespective of which instances of observation code have or have not been executed since these two functions are distinct.

Viewed from another aspect the present invention provides an integrated circuit comprising:

a processor operable to execute an operating system computer program including at least one execution point corresponding to an execution event to be logged;

observation logic operable upon execution of said at least one execution point to store in an event data store event data characterizing one or more parameters associated with said execution event;

response logic operable independently of execution of said at least one execution point to read said event data from said event data store and in dependence upon said event data to generate one or more power control commands; and a power controller responsive to said one or more power control commands to control power consumption of said integrated circuit.

Viewed from a further aspect the present invention provides a computer program product carrying a computer program for controlling an integrated circuit executing an operating system computer program including at least one execution point corresponding to an execution event to be logged, said computer program product comprising:

observation code triggered upon execution of said at least one execution point to store in an event data store event data characterizing one or more parameters associated with said execution event;

response code triggered independently of execution of said at least one execution point to read said event data from said event data store and in dependence upon said event data to generate one or more power control commands; and power command generating code operable in response to said one or more power control commands to control power consumption of said integrated circuit.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
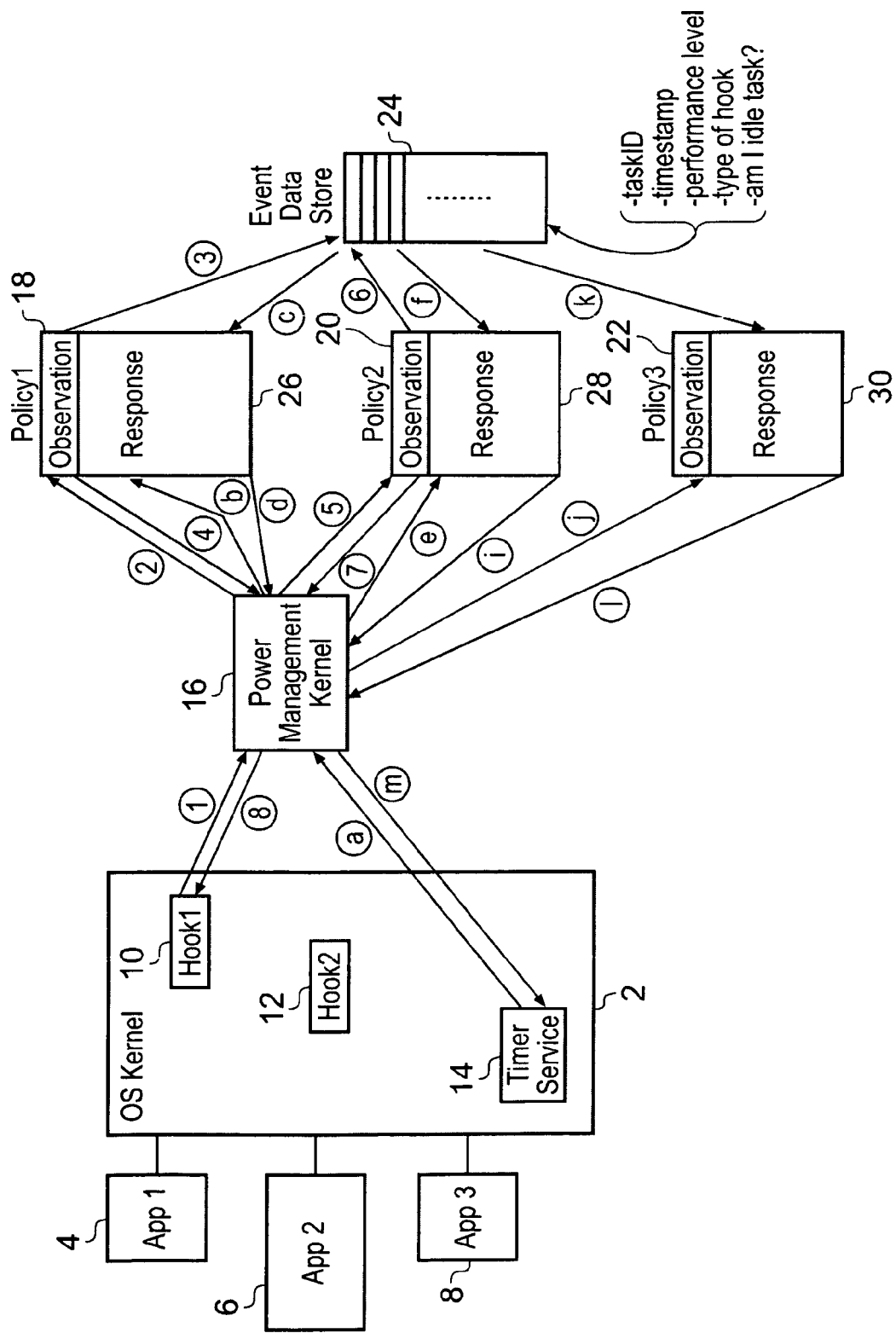
FIG. 1 schematically illustrates the present technique of divided observation and response in power management control.

FIG. 1 shows an operating system 2 controlling and scheduling to execution of multiple application programs 4, 6, 8. The action of an operating system 2 in task scheduling such application programs 4, 6, 8 is conventional in the field of operating systems. Within the operating system 2 are provided multiple "hooks" 10, 12 which are associated with the execution point of the operating system 2 reaching respective positions. These execution points 10, 12 are associated with events of significance to power management control, such as task switching, stalls, starting of new applications and the like. The operating system 2 also includes a timer service 14 which can be used to trigger certain actions when a timer reaches predetermined values.

As illustrated in FIG. 1, execution point 10 is reached and this serves to trigger entry to a power management kernel 16 via step "1". The power management kernel 16 is passed the identity of the execution point 10 as well as other data such as the currently executing task id, known to the operation system, to a timestamp, the type of execution point reached and whether or not the currently executing task is an idle task. The power management kernel 16 uses the type of execution point indication to determine which of a plurality of power management policies (Policy 1, Policy 2, Policy 3) are registered as having observation code 18, 20, 22 which should be executed when that execution point 10 is reached. In this example, the observation code 18 and 20 for Policy 1 and Policy 2 is so registered and the observation code 22 of Policy 3 is not registered. Thus, as illustrated by steps "2", "3" and "4" the observation code 18 is triggered, executed to write desired event data within an event data store 24 and then a return is made to the power management kernel 16. The same sequence is repeated for observation code 20 at steps "5", "6" and "7". The power management kernel 16 then returns execution to the point immediately following the execution point 10 and the operating system 2 proceeds. The observation code 18, 20 is relatively short and rapid to execute and its time to execute will generally be predictable. Thus, the capture of the event data within the event data store 24 upon execution of the execution point 10 is relatively quick and non-intrusive.

At some later time and independently of the execution points 10, 12 being executed, the timer service 14 reaches a point corresponding to the power management kernel 16 being entered at step "a" so as to execute the instances of response code 26, 28, 30 associated with the different policies. Each of these instances of response code 26, 28, 30 is executed in turn and serves to read the event data from the event data store 24 and determine its power control prediction based upon the stored event data which has previously been captured by the observation code 18, 20, 22 upon the various execution points 10, 12 having been reached. The execution of the various instances of the response code 26, 28, 30 is illustrated at these steps "d" to "l". Finally, when all of the response code 26, 28, 30 has been executed, a return is made from the power management kernel 16 to the operating system 2. The power management kernel 16 also consolidates the predictions generated by the different response code 26, 28, 30 to produce an overall power control command which is applied to the integrated circuit so as to vary its operating voltage or operating frequency.

Figure 2:
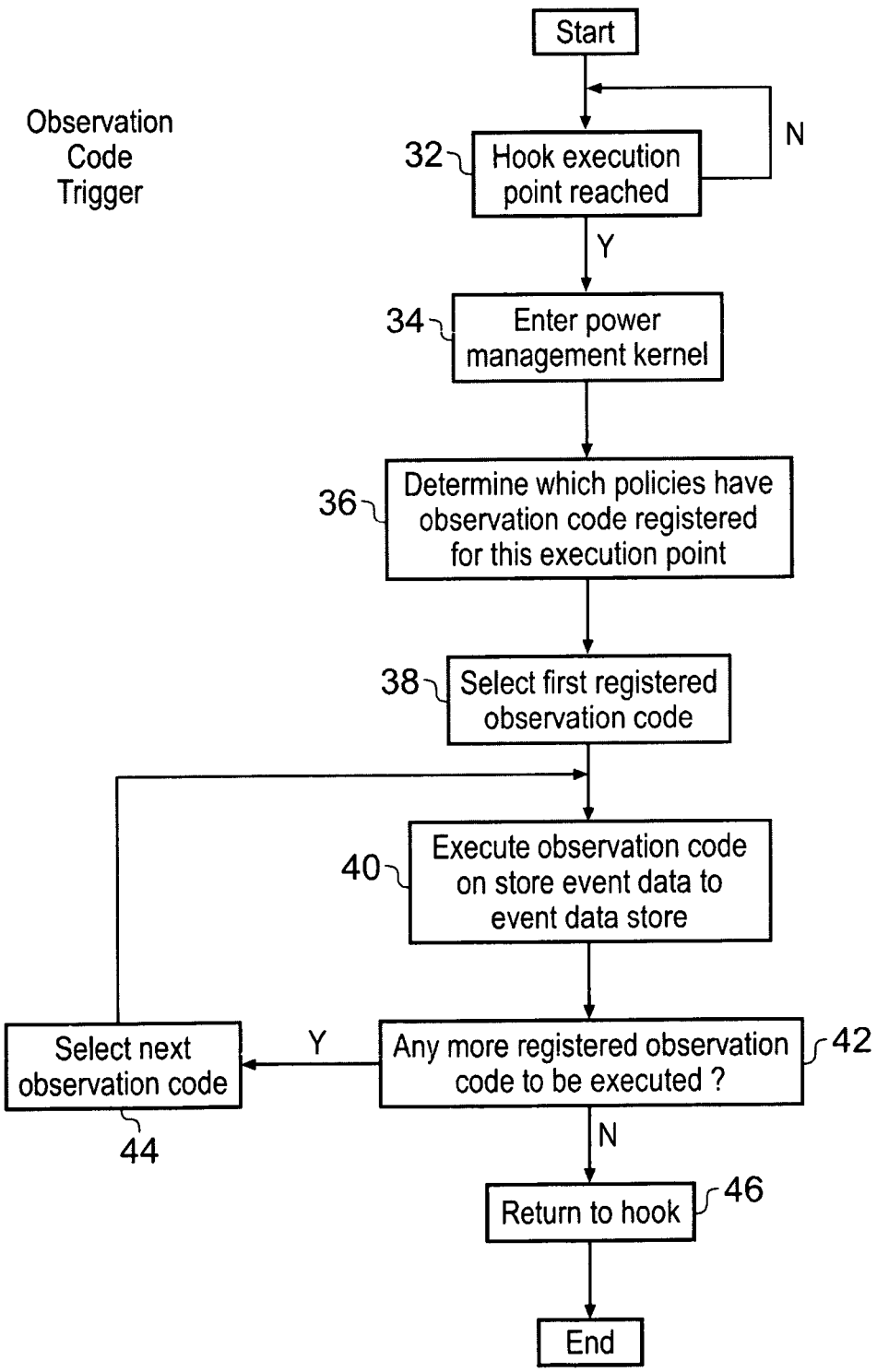
FIG. 2 is a flow diagram schematically illustrating the triggering and execution of observation code.

FIG. 2 is a flow diagram schematically illustrating the triggering and execution of the observation code 18, 20, 22. At step 32 the system waits until an execution point 10, 12 is reached. When such a point is reached, step 34 enters the power management kernel 16. The power management kernel 16 determines at step 36 which of the policies have observation code 18, 20, 22 registered to be executed for this execution point. Step 38 selects the first of these registered observation code instances and then step 40 executes this observation code. Execution of the observation code includes storing event data to the event data store 24. This event data can include the task id of the currently executing task within the application programs 4, 6, 8 being controlled by the operating system 2. Further event data may include a timestamp, a currently employed performance level, a type of execution point reached, an indication of whether the task currently being executed by the operating system is an idle task as well as other items specific to a particular instance of observation code. Hardware counters and the like may also be provided and read by the observation code to monitor performance related statistics for the integrated circuit.

At step 42 the system checks whether there are any more instances of observation code to be executed. If there are such instances, then step 44 selects the next instance of observation code and step 40 is repeated. If the determination at step 42 is that there are no further registered instances of observation code to be executed for the execution point concerned, then step 46 returns execution to the execution point of the operating system.

Figure 3:
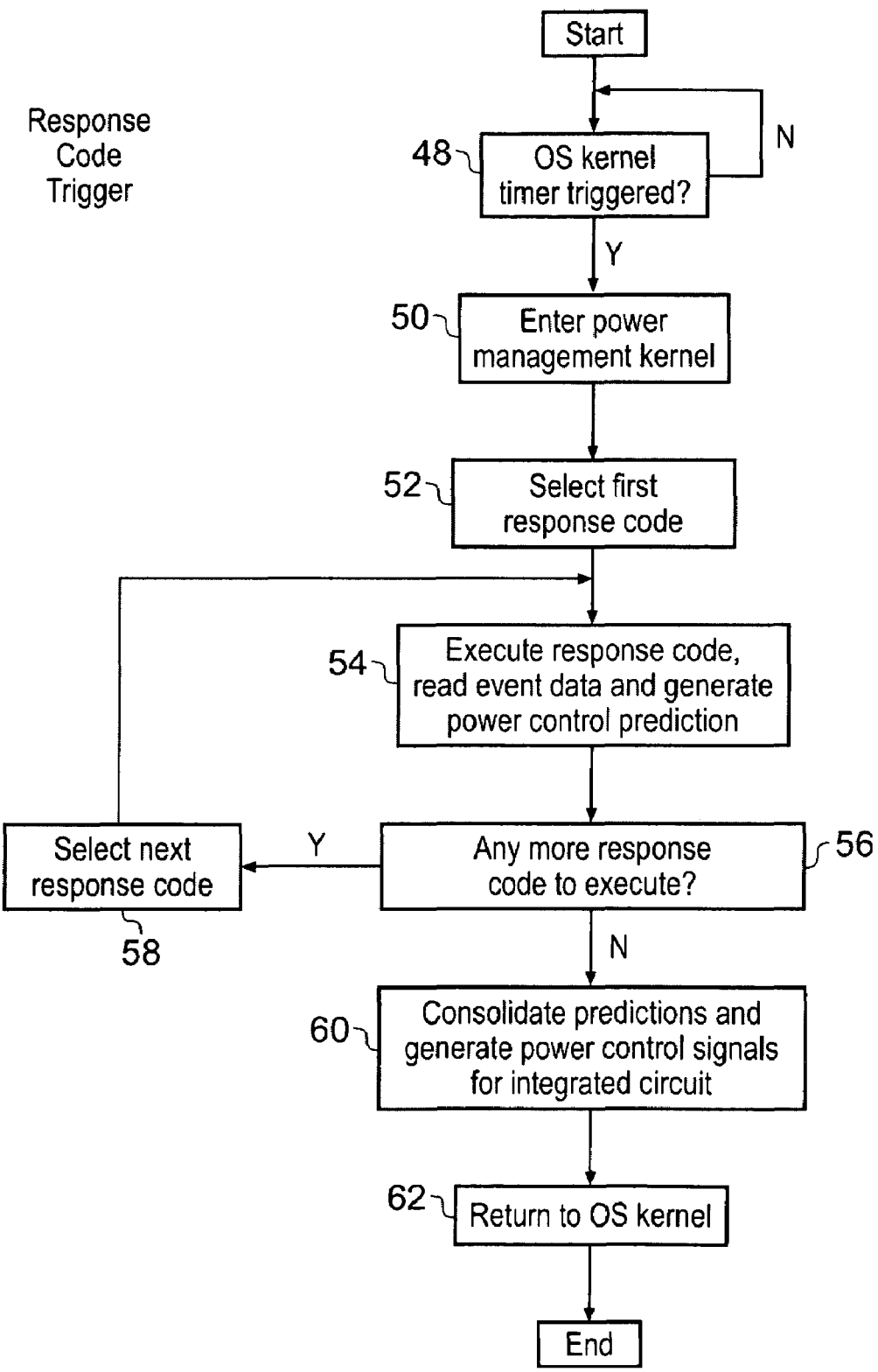
FIG. 3 is a flow diagram schematically illustrating the triggering and execution of response code.

FIG. 3 is a flow diagram schematically illustrating the triggering of response code execution. Step 48 waits for an operating system to generate a timer trigger to initiate response code execution. When such a timer trigger occurs as detected by the timer service 14, then step 50 enters the power management kernel 16. Step 52 selects the first instance of response code 26 to be executed. Step 54 then executes this response code including reading event data from the event data store 24 and generating a power control prediction for that policy. Step 56 determines whether any more response code is present to be executed. It will be noted that all of the instances of response code 26, 28, 30 which are registered with the power management kernel 16 in respect of a given hook will be executed since any of these may be able to make a worthwhile prediction based upon the event data stored within the event data store 24. If there is at least one further instance of response code to be executed, then processing proceeds to step 58 at which the next instance of response code is selected and processing returned to step 54. If all the instances of response code have been executed, then step 60 consolidates the predictions of the individual response code 26, 28, 30 and generates an overall power control signal to be applied to the integrated circuit. Step 62 then returns to the operating system.

Figure 4:
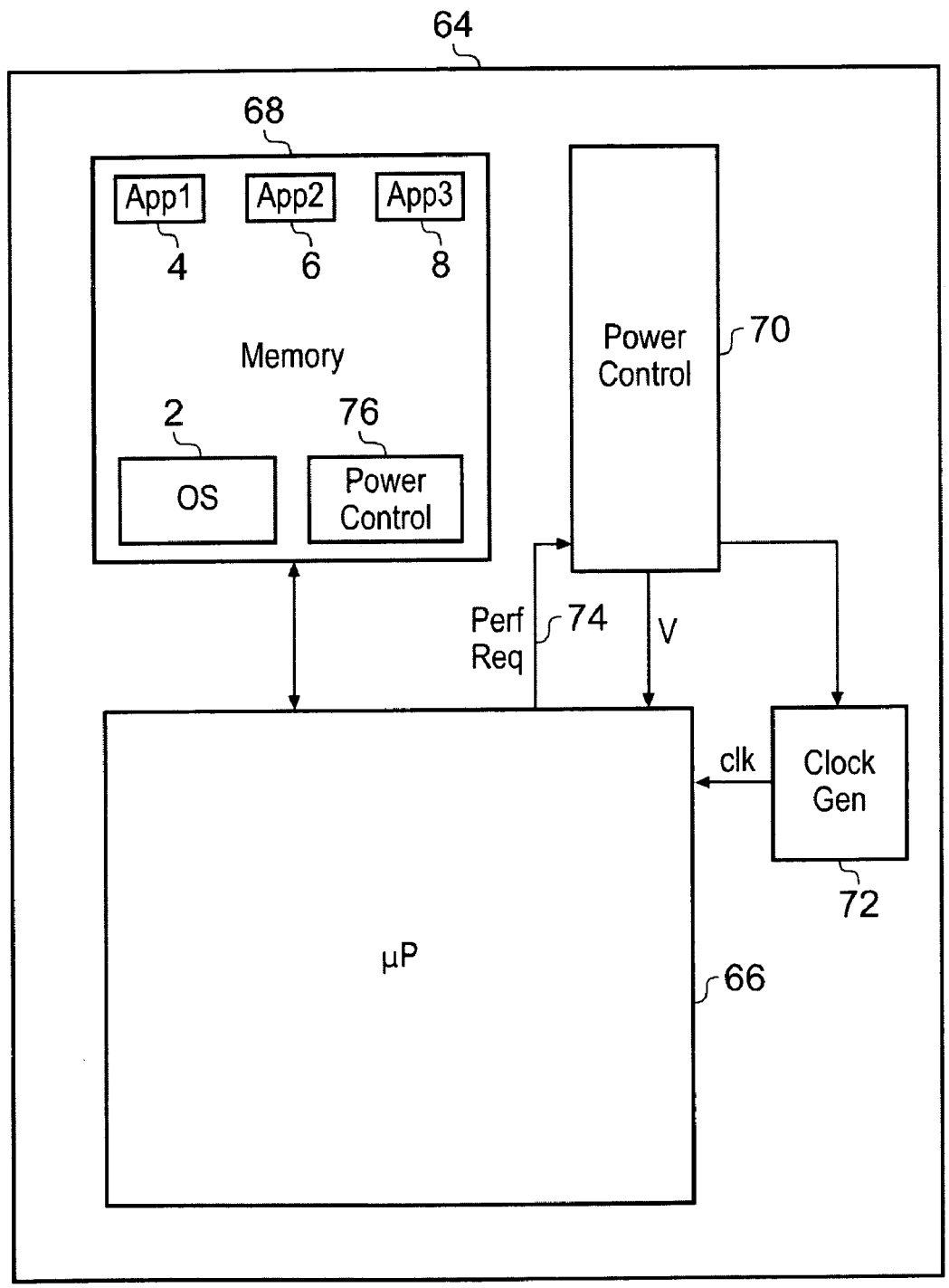
FIG. 4 is a schematic diagram illustrating an integrated circuit using the present techniques.

FIG. 4 schematically illustrates an integrated circuit 64 including a microprocessor core 66, a memory 68, a power control circuit 70 and a clock generator 72. The memory 68 stores an operating system 2, power control software 76 (this can include the power management kernel 16, the various policies, observation code, response code as well as other code) and application programs 4, 6, 8. The computer code from the memory 68 is executed upon the microprocessor core 66. This execution performs the techniques illustrated in FIGS. 1, 2 and 3 as well as execution of the application programs 4, 6, 8 and other processing tasks. Execution of the power control software generates a performance requirement signal 74 which is supplied to a power controller 70. The power control 70 uses this performance requirement signal 74 to determine an operating voltage V to be supplied to the microprocessor core 66. The power controller 70 also controls a clock generator 72 to adjust the operating clock frequency being supplied to the processor core 66. In this way, the processing performance of the processor core 66 can be controlled to be equal to substantially the minimum required performance for the currently executing application programs 4, 6, 8. This saves energy and thereby improves battery life etc.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of controlling power consumption of an integrated circuit, said method comprising the steps of:

executing an operating system computer program including at least one execution point corresponding to an execution event to be logged;

upon execution of said at least one execution point, triggering execution of observation code operable to store in an event data store event data characterizing one or more parameters associated with said execution event;

independently of execution of said at least one execution point, triggering execution of response code operable to read said event data from said event data store and in dependence upon said event data to generate one or more power control commands; and in response to said one or more power control commands, controlling power consumption of said integrated circuit.

2. A method as claimed in claims 1, wherein execution of said response code is triggered by a timer monitored by said operating system computer program.

3. A method as claimed in claim 1, wherein said event data includes one or more of:

a timestamp;

a task identifier of a currently executing task;

a currently set performance level of said integrated circuit;

an identifier of an execution event corresponding to said event data; and an indication of whether a currently executing task is an idle task.

4. A method as claimed in claim 1, wherein power consumption of said integrated circuit is controlling by varying one or more of:

operating voltage; and clock speed.

5. A method as claimed in claim 1, wherein said operating system computer program is operable to schedule execution of one or more application computer programs and said power consumption is controlled to give a substantially minimum level of processing performance required to meet processing requirements of one or more currently executing application computer programs.

6. A method as claimed in claim 1, wherein execution of said execution point triggers execution of power management kernel code operable to determine which of a plurality of instances of observation code are associated with said execution point and to trigger execution of those instances of observation code associated with said execution point.

7. A method as claimed in claim 6, wherein each instance of observation code has an associated instance of response code and all instances of response code are triggered to execute from the same stimulus.

8. An integrated circuit comprising:

a processor operable to execute an operating system computer program including at least one execution point corresponding to an execution event to be logged;

observation logic operable upon execution of said at least one execution point to store in an event data store event data characterizing one or more parameters associated with said execution event;

response logic operable independently of execution of said at least one execution point to read said event data from said event data store and in dependence upon said event data to generate one or more power control commands; and a power controller responsive to said one or more power control commands to control power consumption of said integrated circuit.

9. A computer program product comprising a computer readable storage medium including computer readable instructions for controlling an integrated circuit executing an operating system computer program including at least one execution point corresponding to an execution event to be logged, said computer program product comprising:

observation code triggered upon execution of said at least one execution point to store in an event data store event data characterizing one or more parameters associated with said execution event;

response code triggered independently of execution of said at least one execution point to read said event data from said event data store and in dependence upon said event data to generate one or more power control commands; and power command generating code operable in response to said one or more power control commands to control power consumption of said integrated circuit.

* * * * *